W. B. ANDERSON.
PRESSURE GAGE.
APPLICATION FILED DEC. 22, 1919.
1,384,422.
Patented July 12, 1921.
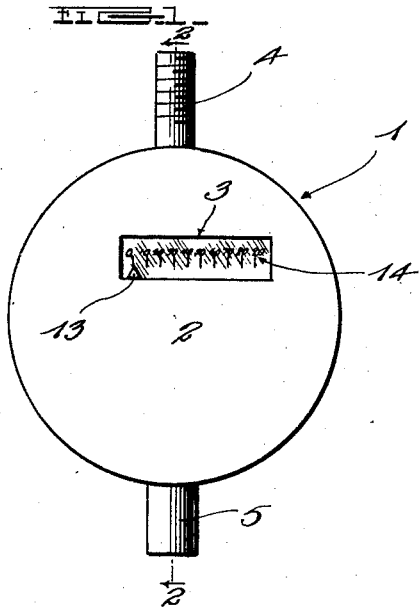
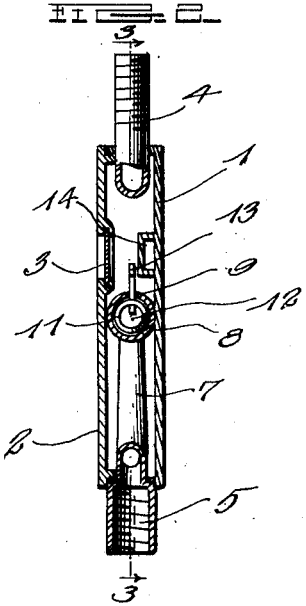
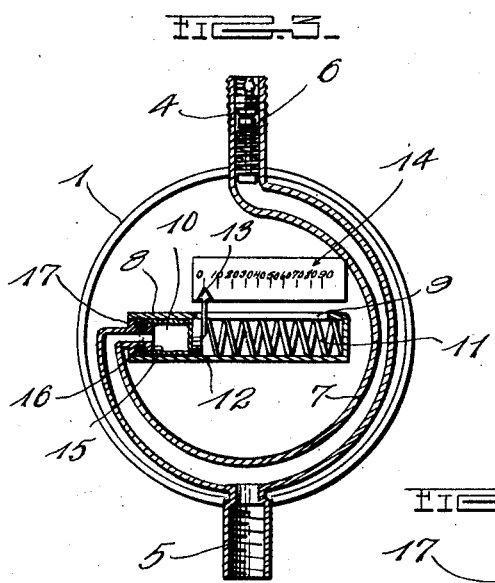
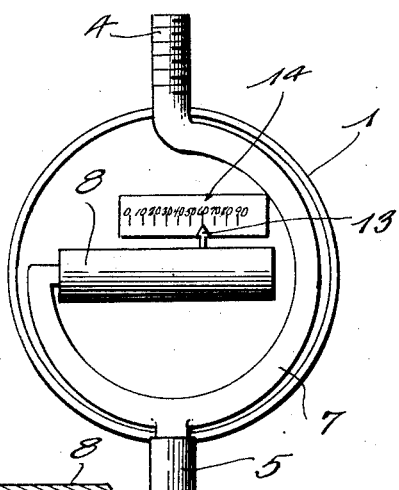
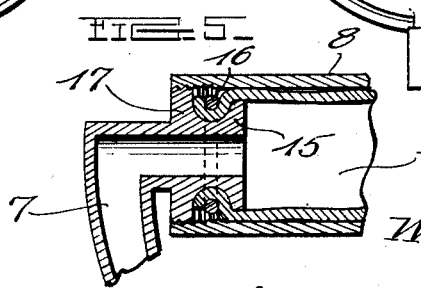
Witness
George H. Simmonette
Inventor
W. B. Anderson
By H. B. Wilson & Co.
Attorneys

UNITED STATES PATENT OFFICE.

WILLIAM BASIL ANDERSON, OF MOLSON, WASHINGTON.

PRESSURE-GAGE.

1,384,422.  Specification of Letters Patent.  Patented July 12, 1921.

Application filed December 22, 1919. Serial No. 346,458.

*To all whom it may concern:*

Be it known that I, WILLIAM B. ANDERSON, a citizen of the United States, residing at Molson, in the county of Okanogan and State of Washington, have invented certain new and useful Improvements in Pressure-Gages; and I do declare the following to be a full, clear, and exact description of the invention, such as will enable others skilled in the art to which it appertains to make and use the same.

This invention relates to improvements in gages for indicating pressure, and it has more particular reference to an air gage which is especially designed to be attached, either temporarily or permanently, to a standard type of tire-valve so as to indicate the pressure in the tire at all times and under all circumstances, thus obviating the necessity of attaching a gage to the tire-valve every time it is desired to know the pressure contained in the tire.

Another object of the invention is to provide a simple and effective gage for the above mentioned purpose which is also compact, light in weight, one that may be readily attached to, and detached from the tire-valve, and one which is exceedingly inexpensive, yet highly efficient in use.

Other objects and advantages of the invention will be apparent during the course of the following description.

In the accompanying drawings forming a part of this specification, and in which like numerals are employed to designate like parts throughout the same,—

Figure 1 is an elevation of a gage constructed in accordance with my invention.

Fig. 2 is a central vertical section on the plane of the line 2—2 of Fig. 1.

Fig. 3 is a central longitudinal section on the plane of the line 3—3 of Fig. 2.

Fig. 4 is an elevation of a gage with the cover removed.

Fig. 5 is an enlarged detail view of a portion of the gage.

In the drawings, wherein for the purpose of illustration a preferred embodiment of my invention is shown, the numeral 1 indicates a substantially cylindrical casing which is provided with a removable screw cover 2, the latter having a sight-opening 3, by means of which the gage is read. While I have shown the cover 2 as being connected with the casing 1 by screw-threads, I desire it to be understood that this cover may be secured to the body of the casing in any other manner. Extending into the casing 1 at points directly opposite each other are a pair of nipples 4 and 5. The nipple 4 serves as an inlet nipple and is provided with any type of a check-valve 6, so that an air pump may be connected to this nipple in the usual manner. On the other hand, the nipple 5 serves as an outlet nipple and this nipple is internally threaded and is designed to be connected to a tire-valve. I desire it to be understood that before my gage is attached to the tire-valve, I first remove the usual check-valve from the tire-valve and place this check-valve in the internally threaded inlet 4. Air is fed from the inlet 4 to the outlet 5 by means of a substantially circular air conduit or pipe 7 which may be either cast integral with these nipples 4 and 5 or may be made separate from them, or in fact connected to them in any suitable manner. As shown, pipe 7 is substantially circular in shape and is of a length equal to approximately three-quarters of the circumference of the casing 1. The outlet 5 may be connected to pipe 7 at any point, but it is preferably connected at a point intermediate its ends. A cylinder 8 is connected to the opposite open end of the air-pipe 7 and is disposed in parallelism with the sight opening 3, it being slightly below said opening. This cylinder 8 is provided in one side with a slot 9, for a purpose which will hereinafter be set forth. By reference to Fig. 5 it will be seen that the open end of the air-pipe 7 extends through the open end of the cylinder 8 and into the interior thereof, and secured to the open end of the pipe 7 and also disposed in the cylinder 8 is an expansible member 10 which is preferably in the form of a rubber bag, being elongated when air is forced into it. In order to resist elongation and expansion of the bag 10, I provide a spring, preferably a coiled spring 11, which is also disposed in the cylinder 8. Interposed between the spring 11 and the expansible bag 10 is a follower 12 which carries a pointer or indicator 13 which moves back and forth in the slot 9. As is obvious, this pointer 13 is designed to coact with a graduated scale 14 also in the casing 1.

I desire it to be understood that the bag 10 is so connected to the air-pipe 7 that it may be readily removed and replaced should it become damaged. Spring 11 is also removable. In order to accomplish the above features any suitable arrangement of the parts may be employed, such as for example, the air-pipe 7 may be provided with a flange 15 on its extreme end, and the open end of the bag 10 may be retained on this flange by means of a cord or other flexible element 16 in the manner shown more clearly in Fig. 5. In addition to the flange 15 the pipe 7 may also be provided with a second threaded flange 17 which will permit it to be held in engagement with the internally threaded open end of the cylinder 8, thus retaining the parts together.

The operation of the device is as follows: As before stated, I first remove the check-valve from the tire-valve by means of a suitable valve tool and place this valve into the internally threaded nipple 4 of the gage. Then, I screw the nipple 5 over the tire-valve so as to retain the gage in position. I desire it to be understood that the outlet nipple may either be internally threaded and fit over the tire-valve, or it may be externally threaded and be screwed into the tire-valve. However, this construction is immaterial. After the gage is in the position just described, an ordinary bicycle pump will be connected to the inlet nipple 4, whereby the desired amount of air may be placed in the tire in the usual manner. During the passage of the air into the inner tube, a quantity of the air will also pass into the expansible bag 10 and cause it to expand, or rather, be elongated. Such elongation of the bag will cause the follower 12 and the pointer 13 to move in a direction against the tension of the spring 11, and the pointer 13 will move across the graduated scale 14 and indicate the pressure within the tire. So, it will be seen, that a driver may at all times know the pressure in the tires.

A device constructed in accordance with the foregoing description will be found exceedingly useful to automobile owners, in that it will indicate at all times the pressure within the tires, thus obviating the necessity of using the ordinary type of tire-gage every time it is desired to test the tires. With this device it will not be necessary to remove the gage at any time, and it is of such construction that it will enable the operator to judge just how much air to place in his tires because of the fact that the gage will register during the pumping of the air into the tires. In this way the car owner is not very liable to blow-out his tires because of an excessive amount of air being pumped into them. With the ordinary tire-gage it is necessary to pump air into the tire, then disconnect the pump and test the tire, if the desired amount of air has not been placed in the tire it is necessary to again attach the pump and place more air in the tire until the desired pressure is obtained. My gage overcomes this disadvantage.

From the foregoing description taken in connection with the accompanying drawings it is believed that the manner of using, and main advantages of my tire-gage are entirely clear, therefore, further description is deemed unnecessary.

I claim:

A pressure gage comprising a cylinder, open at one end and provided in one side with a slot which terminates adjacent the opposite end thereof, an air conduit extending into and closing the open end of said cylinder, an expansible bag arranged in the cylinder and connected at its open end to said conduit, a coiled spring arranged in the cylinder between the closed end thereof and the closed end of said bag, a disk follower in the cylinder between the bag and the spring, a pointer fixed to said follower and extending through the slot in the cylinder, a graduated scale in close proximity to the pointer which coacts with it, and means for connecting the conduit to a tire valve.

In testimony whereof I have hereunto set my hand.

WILLIAM BASIL ANDERSON.